(12) United States Patent
Kelliher et al.

(10) Patent No.: US 7,340,464 B2
(45) Date of Patent: Mar. 4, 2008

(54) METHOD FOR AUTOMATED WEB SITE MAINTENANCE VIA SEARCHING

(75) Inventors: Margaret Therese Kelliher, Scotia, NY (US); Kathryn Eike Dudding, Clifton Park, NY (US); Robert Bruce Saltzman, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 1403 days.

(21) Appl. No.: 09/803,432

(22) Filed: Mar. 9, 2001

(65) Prior Publication Data

US 2001/0037347 A1 Nov. 1, 2001

Related U.S. Application Data

(60) Provisional application No. 60/188,511, filed on Mar. 10, 2000.

(51) Int. Cl.
*G06F 17/30* (2006.01)
*G06F 17/00* (2006.01)

(52) U.S. Cl. .................. 707/10; 707/100; 707/102; 707/104.1; 715/501.1; 715/513; 709/217; 709/218; 709/219

(58) Field of Classification Search ............ 707/1–10, 707/104.1, 100–102; 715/501.1, 513–514, 715/51, 500, 530, 531; 709/200–207, 217–219, 709/224, 245
See application file for complete search history.

(56) References Cited

U.S. PATENT DOCUMENTS

| | | | | |
|---|---|---|---|---|
| 5,894,554 A | | 4/1999 | Howell et al. ............... | 395/200 |
| 5,918,237 A | * | 6/1999 | Montalbano ................. | 715/513 |
| 5,933,827 A | * | 8/1999 | Cole et al. ................... | 707/10 |
| 5,940,834 A | * | 8/1999 | Pinard et al. ................ | 707/102 |
| 6,078,916 A | * | 6/2000 | Culliss ......................... | 707/5 |
| 6,088,707 A | * | 7/2000 | Bates et al. ................ | 715/501.1 |
| 6,148,289 A | * | 11/2000 | Virdy ............................ | 707/3 |
| 6,157,926 A | * | 12/2000 | Appleman et al. .......... | 707/102 |
| 6,163,779 A | * | 12/2000 | Mantha et al. .............. | 707/100 |
| 6,182,113 B1 | * | 1/2001 | Narayanaswami .......... | 709/203 |
| 6,195,681 B1 | * | 2/2001 | Appleman et al. .......... | 709/203 |
| 6,304,886 B1 | * | 10/2001 | Bernardo et al. ........... | 715/530 |

(Continued)

OTHER PUBLICATIONS

"Resume—Bright and Professional ICS: Free Web Resume and Index Your Resume:" of brighttrays.com dated Feb. 9, 1999 from http://web.archive.org (19990209180859 & 19981202002335/brightrays.com/resume . . . ).*

*Primary Examiner*—John Breene
*Assistant Examiner*—Anh Ly
(74) *Attorney, Agent, or Firm*—Penny A. Clarke; Patrick K. Patnode

(57) ABSTRACT

A method for adding HTML documents to a web site involves the addition of HTML keywords to each HTML document. One HTML keyword is provided per category of information. A search for each category of information is determined, and the searches are to be performed by a search engine. When a category on the web site is selected, a search engine is called to execute the search corresponding to the selected category of information. The search is not visible to a user of the web site. An up-to-date web page is presented for the selected category of information. The up-to-date web page includes a hypertext reference having a link to each pertinent HTML document this is identified by the search.

22 Claims, 4 Drawing Sheets

U.S. PATENT DOCUMENTS

| | | | |
|---|---|---|---|
| 6,336,112 B2 * | 1/2002 | Chakrabarti et al. | 707/5 |
| 6,374,260 B1 * | 4/2002 | Hoffert et al. | 707/104.1 |
| 6,381,597 B1 * | 4/2002 | Lin | 707/4 |
| 6,460,060 B1 * | 10/2002 | Maddalozzo et al. | 715/513 |
| 6,466,940 B1 * | 10/2002 | Mills | 707/102 |
| 6,480,852 B1 * | 11/2002 | Himmel et al. | 707/10 |
| 6,516,312 B1 * | 2/2003 | Kraft et al. | 707/3 |
| 6,516,337 B1 * | 2/2003 | Tripp et al. | 709/202 |
| 6,546,387 B1 * | 4/2003 | Triggs | 707/5 |
| 6,546,393 B1 * | 4/2003 | Khan | 707/10 |
| 6,567,800 B1 * | 5/2003 | Barrera et al. | 707/3 |
| 6,594,664 B1 * | 7/2003 | Estrada et al. | 707/10 |
| 6,691,108 B2 * | 2/2004 | Li | 707/3 |
| 6,734,886 B1 * | 5/2004 | Hagan et al. | 715/853 |
| 6,763,496 B1 * | 7/2004 | Hennings et al. | 715/501.1 |
| 6,892,238 B2 * | 5/2005 | Lee et al. | 709/224 |
| 6,973,505 B1 * | 12/2005 | Schneider | 709/245 |
| 7,168,034 B2 * | 1/2007 | Hennings et al. | 715/500.1 |
| 2001/0007991 A1 * | 7/2001 | Tobin | 709/203 |
| 2001/0047362 A1 * | 11/2001 | Comroe | 707/104.1 |
| 2002/0032677 A1 * | 3/2002 | Morgenthaler et al. | 707/3 |
| 2002/0099700 A1 * | 7/2002 | Li | 707/5 |
| 2002/0198939 A1 * | 12/2002 | Lee et al. | 709/203 |
| 2003/0115546 A1 * | 6/2003 | Dubey et al. | 715/501.1 |
| 2003/0204485 A1 * | 10/2003 | Triggs | 707/1 |
| 2003/0217117 A1 * | 11/2003 | Dan et al. | 709/218 |
| 2004/0024848 A1 * | 2/2004 | Smith et al. | 709/219 |
| 2004/0068527 A1 * | 4/2004 | Smith | 707/204 |
| 2004/0103097 A1 * | 5/2004 | Wesinger et al. | 707/9 |
| 2004/0215664 A1 * | 10/2004 | Hennings et al. | 707/104.1 |
| 2005/0050166 A1 * | 3/2005 | Reynolds et al. | 709/218 |

* cited by examiner

METHOD FOR AUTOMATED WEB SITE MAINTENANCE VIA SEARCHING

CROSS REFERENCE TO RELATED APPLICATIONS

This application claims priority to provisional patent application Ser. No. 60/188,511 filed Mar. 10, 2000.

BACKGROUND OF THE INVENTION

The present invention relates generally to adding hypertext markup language (HTML) documents to a web site and having the added HTML documents automatically available for reading, without creating specific web pages to access the new HTML documents and without using a database. This method minimizes the tasks that a web site designer performs when adding new HTML documents to web sites.

In heavily-linked environments, keeping a web site up to date can be time-consuming. A heavily-linked environment can be defined as an environment where the same HTML documents are reachable from several categories. For web sites where new HTML documents frequently become available, adding new links to these HTML documents for each category can become a difficult task. Further, in environments where web sites repackage HTML documents in many different ways for many different audiences by, for example, increasing numbers of categories, the problem of updating the web site becomes even more difficult.

Typically, heavily-linked environments are updated by creating a database on the HTML documents, and the HTML documents are described in terms of categories and locations in the database. Usually at the web site reader's explicit selection of a category, the database is searched for desired HTML documents. The database method requires that the web server run a database application, and using the method also requires that the database be periodically maintained. As such, there is a desire to create a method to add HTML documents to a web site without creating specific web pages to access the new HTML documents and without using a database.

BRIEF SUMMARY OF THE INVENTION

In one exemplary embodiment, a method is provided for adding an HTML document to a web site. The HTML document relates to a respective one of a plurality of categories of information. The method comprises adding an HTML keyword to the HTML document. The HTML keyword represents the respective one of the plurality of categories of information. The HTML document is uploaded to a directory on the web site. A search is activated in the directory when the respective one of the plurality of categories of information is selected. The search contains and/or includes at least the HTML keyword. A search engine is called to execute the activated search and produce a search result containing a respective link to each of the at least one searchable HTML documents in the directory that contain the HTML keyword. It should be appreciated that for some searches no HTML documents containing the HTML keyword will be found. From the search result, an up-to-date web page is created for the respective one of the plurality of categories of information. The up-to-date web page includes each respective link to each of the at least one searchable HTML documents containing the HTML keyword. In the case when no HTML documents containing the HTML keyword are found, the up-to-date web page will include no links.

In another exemplary embodiment, a method for maintaining a web site via searching is provided. The method comprises deciding on a plurality of categories of information to be displayed on a web site. A plurality of searches is determined. Each respective one of the plurality of searches corresponds to a respective one of the plurality of categories of information. In addition, a search engine executes each of the plurality of searches. A keyword for each respective one of the plurality of categories of information is assigned. A plurality of directories is set up. Each respective one of the pluralities of directories corresponds to a respective one of the plurality of categories of information. Each of the plurality of directories contains at least one searchable HTML document. At least one HTML document is created and is to be searched by the search engine using at least one of the plurality of searches. At least one assigned keyword is included in an HTML header of the at least one HTML document. A hypertext reference is created and provides the search engine with the at least one of the plurality of searches. The hypertext reference includes an assigned keyword relating to a respective one of the plurality of categories of information. The hypertext reference directs the search engine to search a respective directory relating to the respective one of the plurality of categories of information.

DETAILED DESCRIPTION OF THE INVENTION

Figure 1:
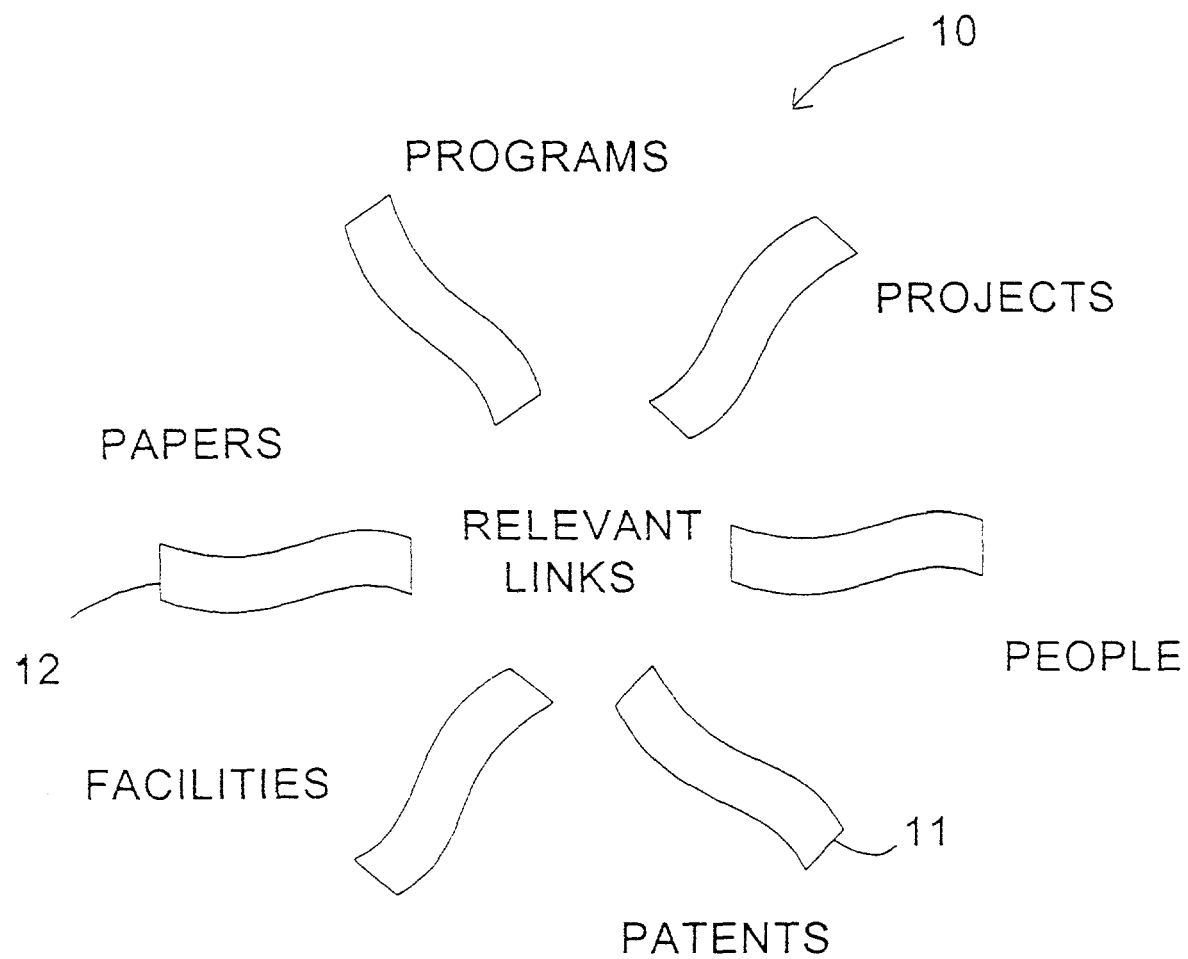
FIG. 1 is an example of an icon a user of the web site would click on to access recent patents and papers on a particular subject.

Referring to the figures, and more particularly to FIG. 1, an icon 10 is provided. In one embodiment, the icon 10 can be displayed to a user on a web page via an Internet browser application. The user of the web site can make a selection to access a number of topics. As shown in FIG. 1, in one embodiment, the topics can comprise recent patents and/or papers on particular technical subjects. Using an input device (not shown) and the functionality of the Internet browser application, the user can select either patents 11 or papers 12 by activating and/or clicking the appropriate topic. By selecting one of the topics, a search engine is called to make a search and to return an up-to-date web page with links to pertinent HTML documents relating to the selected topic. In one embodiment, the search engine is located at the web site. In another embodiment, the search engine is located externally from the web site.

Figure 2:
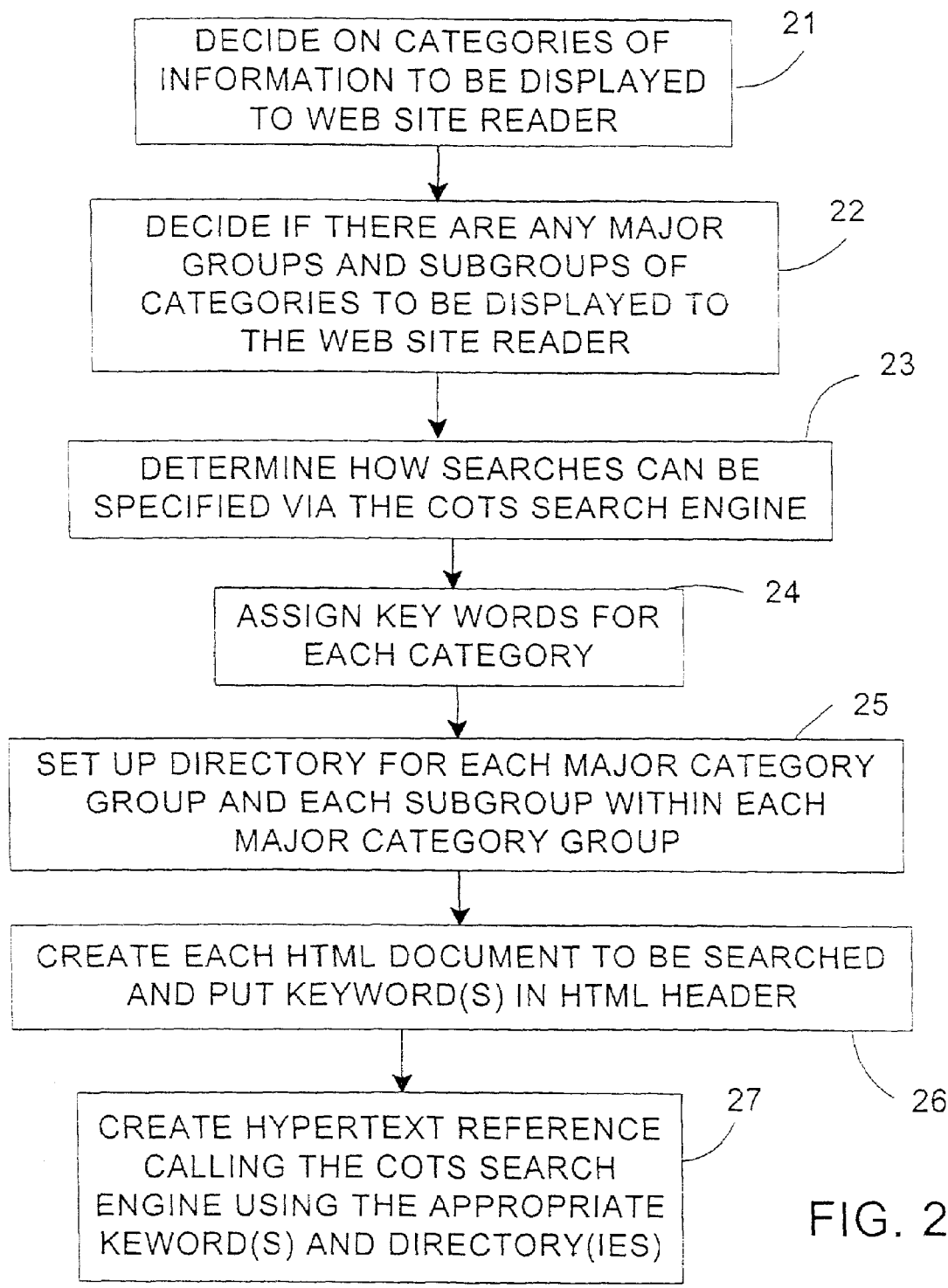
FIG. 2 is a flow diagram showing the process of creating a web site using automated web site maintenance via searching.

In FIG. 2, a web site is created that uses automated web site maintenance via searching. Categories of information to be displayed to the web site reader are decided and/or determined (step 21). The major groups and subgroups of categories (i.e., subsets of information) that are to be displayed to the web site reader are also decided and/or determined (step 22). A search using a selected search engine is determined such that the selected search engine can access the categories, groups and/or subgroups (step 23).

In one embodiment, the selected search engine is a commercial-off-the-shelf (COTS) search engine. Keywords are assigned for each of the categories (step 24). It should be appreciated that, in one embodiment, the keywords can be different from the categories. For example, in FIG. 1, the categories comprise patents 11 and papers 12, and in one embodiment, the keywords can comprise ultrasound and/or visualization. A directory for each major category group and each subgroup within each major category group is created (step 25). It should be appreciated that each directory has a directory name. It should also be appreciated that, in one embodiment, the directories are not redundant forms of the keywords. For example, as shown in FIG. 1, a directory can be formed for each category, such as, for example, patents 11 and papers 12. As such, a directory can be named patents and a directory can be named papers. In one embodiment, a hierarchical directory structure for a web site accessed via searching is shown below, as follows:

Search_group_categories
   Major_group_category__1
      Major_group_category__1.1
      Major_group_category__1.2
   Major_group_category__2
   Major_group_category__3
      Major_group_category__3.1
      Major_group_category__3.2
      Major_group_category__3.3
      Major_group_category__3.4

As stated hereinabove the embodiment shown in FIG. 1, a directory for each category, patents 11 and papers 12, is created. An HTML document representing at least one category, group or subgroup is created such that the HTML document can be searched using the search engine (step 26). The keyword or keywords from the representative category are placed in the HTML header of the HTML document (step 26). A hypertext reference calling the search engine is created (step 27). In one embodiment, the hypertext reference includes the keyword or keywords to be searched, and the hypertext reference also includes the directory or directories that contain the category, group or subgroup of information.

Figure 3:
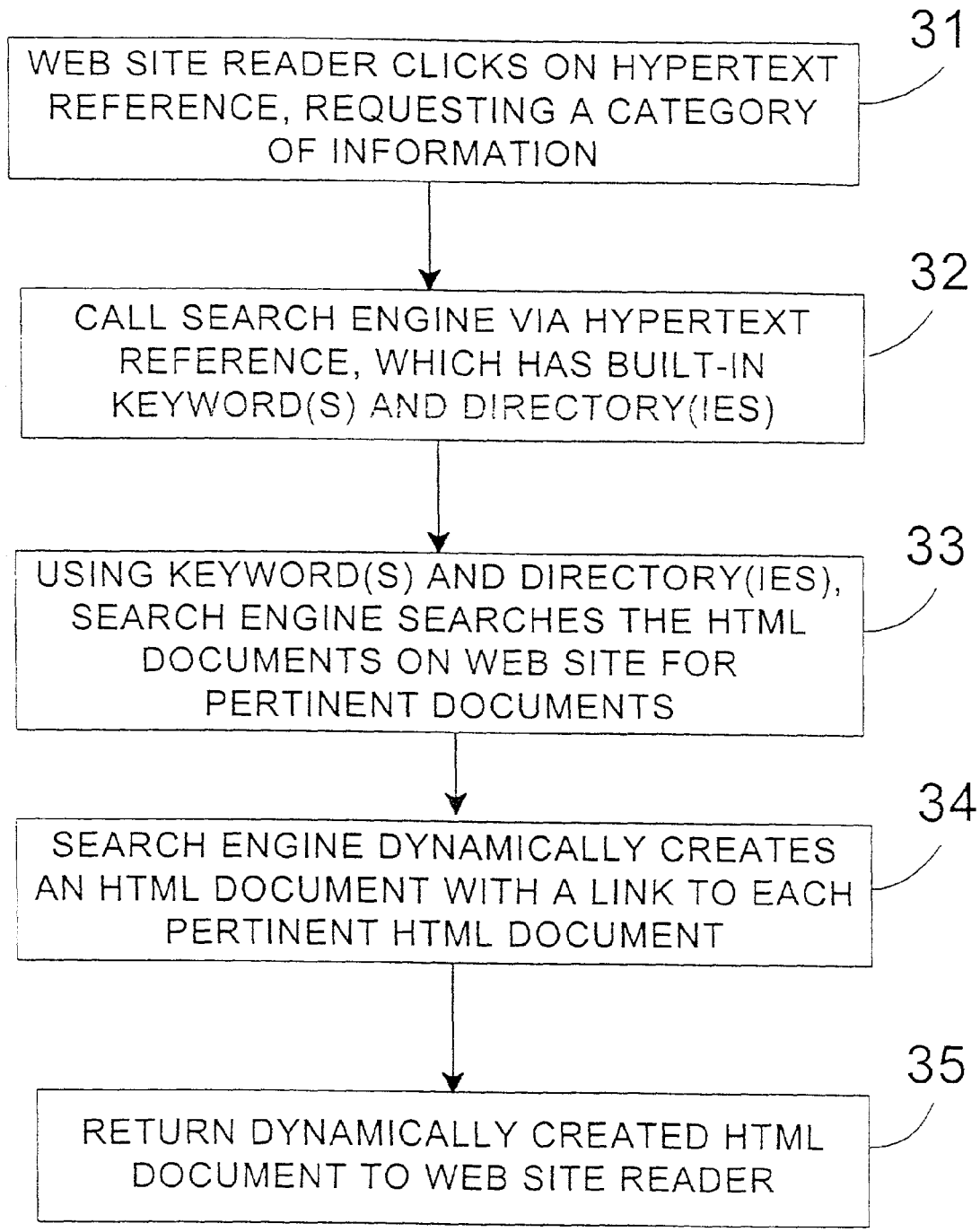
FIG. 3 is a flow diagram showing the logic of the implicit search performed by a search engine at the web site which is activated by a user selection.

As shown in FIG. 3, a search engine is called when a category is selected. In one embodiment, a user or reader of the web site using an Internet browser application can select the category. A category of information is requested (step 31). In one embodiment, the category of information is requested by the user of the web site clicking and/or selecting a hypertext reference that identifies the requested category of information (step 31). A search engine is called by the hypertext reference (step 32). As described hereinabove, in one embodiment, the search engine comprises a commercial-off-the-shelf (COTS) search engine. It should be appreciated that, in one embodiment, the search engine searches the directory that relates to the category of information that is selected. For example, if the category of patents is selected, a search is performed in the patent directory. Further, the search engine searches for the HTML keyword of the category of information selected, such as, for example, ultrasound. Therefore, in one embodiment, the search engine could search the patent directory for HTML documents containing the HTML keyword ultrasound. The hypertext reference includes keyword or keywords that represent the requested category of information, and the hypertext reference includes the directory or directories where the requested category of information is located. Using the keyword(s) and directory(ies) in the hypertext reference, the search engine searches the HTML documents on the web site to identify HTML documents that relate to the requested category of information (step 33). As the search engine identifies the HTML documents relating to the requested category of information, the search engine dynamically creates an HTML document that includes a link to each of the identified HTML documents that relate to the requested category of information (step 34). The HTML document that is dynamically created by the search engine is then returned to the user or reader of the web site (step 35). As discussed above, it should be appreciated that some searches could return no HTML documents that include the HTML keyword that is being search. Therefore, in this embodiment, no links are created. Further, in another embodiment, the user of the web site is notified that the search returned no HTML documents.

Figure 4:
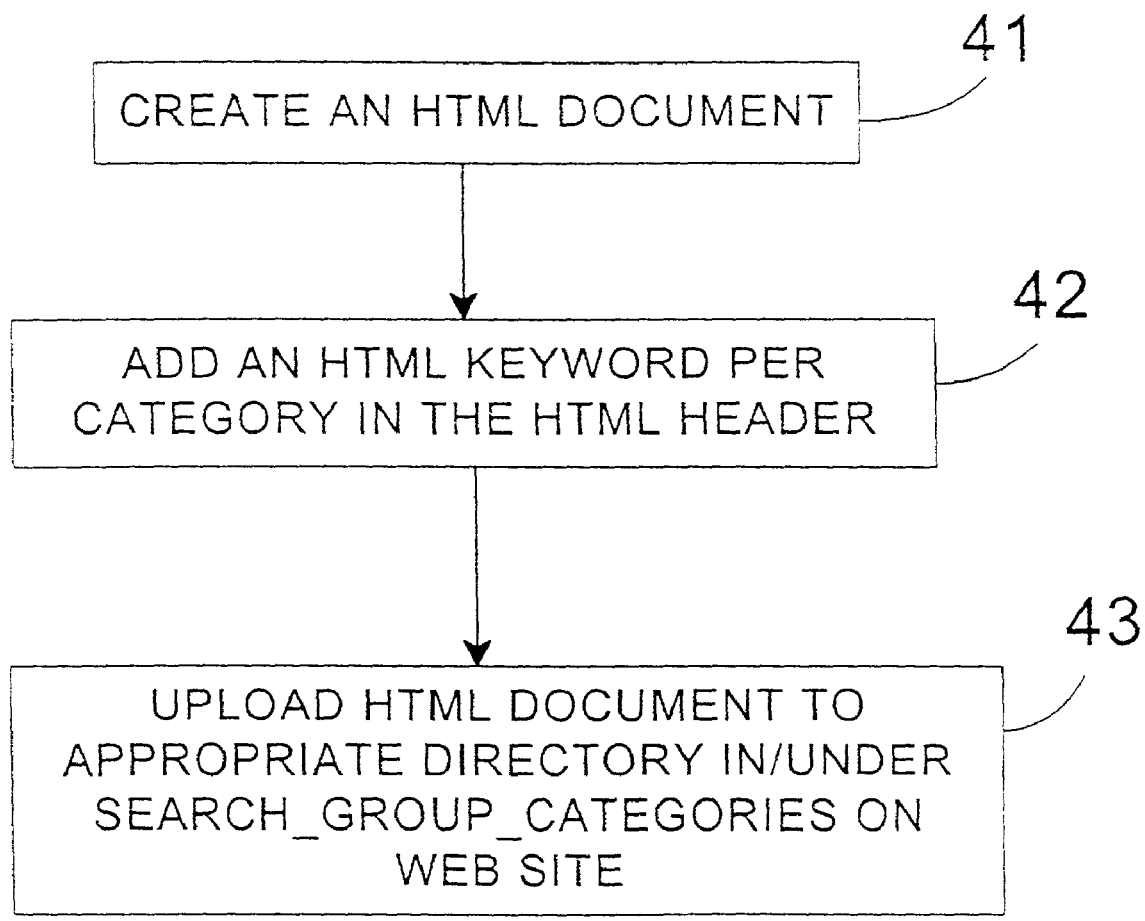
FIG. 4 is a flow diagram showing the process of adding a new HTML document to the web site.

In FIG. 4, a new HTML document is added to the web site without the use of a database. A new HTML document is created (step 41). An HTML keyword is added to the HTML header of the created HTML document (step 42). In one embodiment, the HTML header is provided in a metatag field of the HTML header. In addition, the search engine searches for the HTML keyword to identify the category of information that is requested. It should be appreciated that, as discussed above, each category has an HTML keyword. Further, as discussed hereinabove, a directory is created for at least each category of information. In order for the search engine to identify the new HTML document, the HTML document is uploaded to a directory in the web site, and the directory relates to the category of information to which the HTML document belongs (step 43).

The foregoing discussion of the invention has been presented for purposes of illustration and description. Further, the description is not intended to limit the invention to the form disclosed herein. Consequently, variations and modifications commensurate with the above teachings and with the skill and knowledge of the relevant art are within the scope of the present invention. The embodiment described herein above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A method for adding an HTML document to a web site, the HTML document relating to a respective one of a plurality of categories of information, the method comprising the steps of:
   adding an HTML keyword to the HTML document wherein the HTML keyword represents the respective one of the plurality of categories of information;
   uploading the HTML document to a directory on the web site, wherein the directory corresponds solely with the category of information represented by the HTML keyword;
   activating a search in the directory when the respective one of the plurality of categories of information is selected, the search containing at least the HTML keyword;
   calling a search engine to execute the activated search and produce a search result wherein the search result identifies a link to the HTML document in the directory containing the HTML keyword; and creating an up-to-date web page for the respective one of the plurality of categories of information from the search result wherein the up-to-date web page includes the link to the HTML documents containing the HTML keyword, such that the HTML documents are automatically available for reading without creating specific web pages to access the HTML documents and without using a database.

2. The method of claim 1, wherein the step of creating an up-to-today web page is dynamically performed by the search engine while calling the activated search.

3. The method of claim 2, further comprising the step of returning the dynamically created HTML document to a user of the web site.

4. The method of claim 1, wherein the HTML keyword is added to the HTML header.

5. The method of claim 4, wherein the HTML keyword is added to the metatag field of the HTML header.

6. The method of claim 1, wherein the directory comprises a plurality of directories, each of the plurality of directories corresponding to a respective one of the plurality of categories of information.

7. The method of claim 1, wherein the step of activating a search is performed when a user of the web site selects the respective one of the plurality of categories.

8. A method for adding an HTML document to a web site, the HTML document relating to at least one of a plurality of categories of information, the method comprising the steps of:
  adding an HTML keyword to the HTML document wherein the HTML keyword represents a respective one of the plurality of categories of information;
  uploading the HTML document to a respective one of a plurality of directories on the web site wherein each of the plurality of directories corresponds to no more than one of the plurality of categories of information, each of the plurality of directories for containing at least one searchable HTML document;
  activating a search for the HTML keyword of the at least one searchable HTML documents in the respective one of the plurality of directories when the respective one of the plurality of categories of information is selected, the search containing at least the HTML keyword;
  calling a search engine to execute the activated search and produce a search result containing a respective link to each of the at least one searchable HTML documents in the respective one of the plurality of directories containing the HTML keyword; and
  creating an up-to-date web page for the respective one of the plurality of categories of information from the search result wherein the up-to-date web page includes each respective link to each of the at least one searchable HTML documents containing the HTML keyword, such that each of the at least one searchable HTML documents are automatically available for reading without creating specific web pages to access the HTML documents and without using a database.

9. The method of claim 8, wherein the step of creating an up-to-today web page is dynamically performed by the search engine while calling the activated search.

10. The method of claim 9, further comprising the step of returning the dynamically created HTML document to a user of the web site.

11. The method of claim 8, wherein the HTML keyword is added to the HTML header.

12. The method of claim 11, wherein the HTML keyword is added to the metatag field of the HTML header.

13. The method of claim 8, wherein the directory comprises a plurality of directories, each of the plurality of directories corresponding to a respective one of the plurality of categories of information.

14. The method of claim 8, wherein the step of activating a search is performed when a user of the web site selects the respective one of the plurality of categories.

15. A method for maintaining a web site via searching, the method comprising the steps of:
  deciding on a plurality of categories of information to be displayed on a web site;
  determining a plurality of searches wherein each respective one of the plurality of searches corresponds to a respective one of the plurality of categories of information, each of the plurality of searches being executed by a search engine;
  assigning a keyword for each respective one of the plurality of categories of information;
  setting up a plurality of directories wherein each respective one of the pluralities of directories corresponds to no more than one of the plurality of categories of information, each of the plurality of directories for containing at least one searchable HTML document;
  creating at least one HTML document to be searched by the search engine using at least one of the plurality of searches and at least one assigned keyword wherein the at least one assigned keyword is included in an HTML header of the at least one HTML document; and
  creating a hypertext reference for providing the search engine with the at least one of the plurality of searches, the hypertext reference including an assigned keyword relating to a respective one of the plurality of categories of information wherein the hypertext reference directs the search engine to search a respective directory relating to the respective one of the plurality of categories of information, such that the at least one HTML document is automatically available for reading without creating specific web pages to access the at least one HTML document and without using a database.

16. The method of claim 15, further comprising the step of deciding on groups of the plurality of categories of information and subgroups of the plurality of categories of information to be displayed on the web site.

17. The method of claim 16, wherein each respective one of the plurality of directories corresponds to a respective one of the groups of the plurality of categories of information.

18. The method of claim 17, wherein each respective one of the plurality of directories corresponds to a respective one of the sub-groups of the plurality of categories of information.

19. The method of claim 15, further comprising the step of creating from a result of the at least one determined search by the search engine an up-to-date web page for the respective one of the plurality of categories wherein the up-to-date web page comprises at least one link to each of the at least one searchable HTML document having an assigned keyword relating to the respective one of the plurality of categories.

20. The method claim 19, wherein the step of creating a hypertext reference is dynamically performed by the search engine while the search engine searches the at least one searchable HTML document in the respective directory relating to the respective one of the plurality of categories.

21. The method of claim 15, wherein the assigned keyword is included in the metatag field of the HTML header of the at least one HTML document.

22. A method for maintaining a web site via searching, the method comprising the steps of:
   deciding on a category of information to be displayed on a web site;
   determining a search corresponding to the category of information, the search being executed by a search engine;
   assigning a keyword for the category of information;
   setting up a directory that corresponds to no more than one category of information, the directory containing at least one searchable HTML document;
   creating an HTML document to be searched by the search engine using the search and the assigned keyword wherein the at least one assigned keyword is included in an HTML header of the HTML document; and
   creating a hypertext reference for providing the search engine with the search, the hypertext reference including an assigned keyword relating to the category of information wherein the hypertext reference directs the search engine to search the directory relating to the category of information, such that HTML documents are automatically available for reading without creating specific web pages to access the HTML documents and without using a database.

* * * * *